Figure 1:
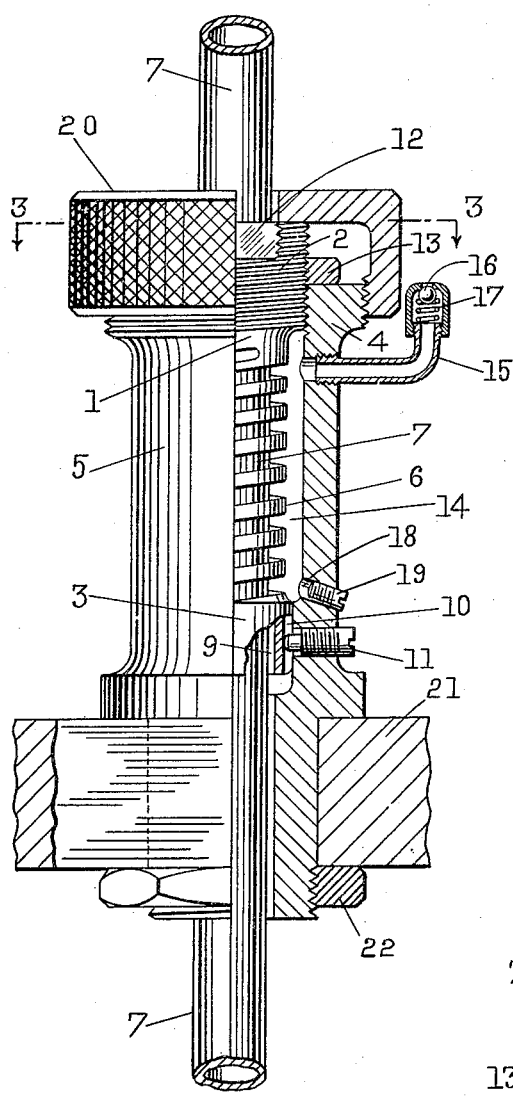

April 18, 1933.   E. C. COPE   1,904,203

BEARING AND APPLICATION THEREOF

Filed March 29, 1929

ERNEST CECIL COPE
INVENTOR

ATTORNEYS

Patented Apr. 18, 1933

1,904,203

UNITED STATES PATENT OFFICE

ERNEST CECIL COPE, OF SPONDON, NEAR DERBY, ENGLAND, ASSIGNOR TO CELANESE CORPORATION OF AMERICA, A CORPORATION OF DELAWARE

BEARING AND APPLICATION THEREOF

Application filed March 29, 1929, Serial No. 350,920, and in Great Britain April 11, 1928.

This invention relates to bearings and mountings for spindles or shafts and applications thereof and it has for one of its objects to provide a new or improved bearing that is capable of adjustment in diameter. A further object is to provide a bearing that is flexible and tends to damp lateral and axial vibrations of the spindle or shaft.

The invention is particularly applicable for textile spindles for use in spinning, twisting, doubling, winding and analogous textile operations on natural or artificial fibres, filaments, threads or yarns, especially where high or very high spindle speeds are desired, but it can also be applied with advantage to other spindles or shafts.

A bearing according to the invention comprises a sleeve having its end portions joined by a central or intermediate portion which is of helical formation, the bearing surface presented to the spindle or shaft lying preferably within the length of the helical portion of the sleeve. Adjustment of the bearing is effected by applying torsion to the sleeve, and, conveniently one end of the sleeve is arranged to be held against rotational movement, while the other is provided with means whereby it may be rotated. For instance, this latter end may be provided with flats to receive a key or a hole or holes to a receive a bar, and the end may be plain or threaded to screw into a housing. The end is preferably provided with locking means to hold it in adjusted position, and such means may comprise a lock nut or nuts; a pin passing through a hole in the housing and engaging a hole in the sleeve; ratchet means; or other suitable means. The end of the sleeve that is to be held against rotation may be provided with a key-way engaging a key or pin carried by the housing; or it may be formed otherwise than circular (e. g. square) in cross-section so as to engage a correspondingly shaped recess in the housing; or it may be otherwise held. It will be understood that the diameter of the bearing surface will be increased or decreased according to the direction of rotation of one end of the sleeve relative to the other. The sleeve is preferably made of resilient material such as phosphor bronze or steel, and the ends of the sleeve may be made integral with the helical portion, the helix being cut from the sleeve, as by turning, or the ends may be attached to the helix after it has been formed. For instance, a length of material of suitable section could be coiled and afterwards united to the ends as by welding. The bearing member may be hardened.

In a convenient form of the invention, one end of the sleeve is screwed while the other is provided with a key-way receiving a key carried by a bearing housing, so that as the one end of the sleeve is screwed into the housing, torsion is applied to the helix, thereby increasing or decreasing the bore of the helix according to the direction of rotation of the screwed end. Locking means are provided to secure the bearing in its adjusted position.

The housing preferably affords a space for lubricant surrounding the helix, and means may be provided for causing a circulation of lubricant through the bearing, though sufficient space may be left to take a charge of lubricant that only needs to be replenished at intervals.

It will be understood that the invention can be applied to textile or other spindles whether solid or hollow, and that in the case of textile or like spindles they may or may not be actuated with a traversing motion, cop-building motion, or any other such motion according to requirement. The invention includes all such applications.

The accompanying drawing illustrates one embodiment of the invention, it being understood that they are given only by way of illustration and are in no way limitative.

In the drawing the invention is shown applied as a bearing for a hollow spindle through which may pass a traversing rod carrying a cap or other device co-operating with the spindle to twist and wind a thread on to a bobbin or other carrier mounted on the spindle.

Referring to the drawing:—

Figure 2:
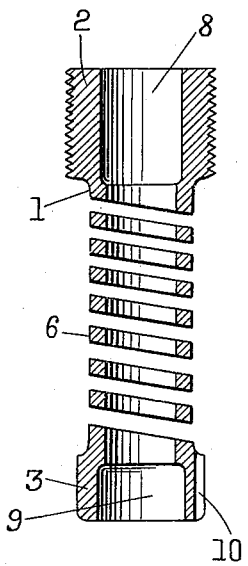
Figure 3:
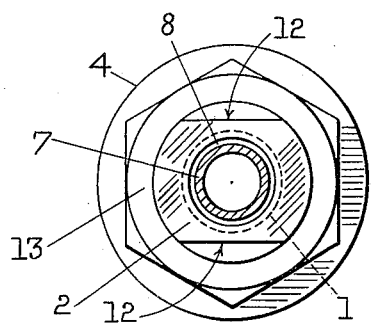

Figure 1 is a vertical elevation, partly in section, of a spindle mounting and bearing according to the invention, Figure 2 is a vertical section of the bearing member, and Figure 3 is a plan view of Figure 1 taken on the line 3—3, the cap of the mounting being removed.

A sleeve 1 is formed with enlarged ends 2, 3, the end 2 being threaded so as to engage a threaded portion 4 of a housing 5 while the other end 3 is a sliding fit in the bore of the housing. Between the two ends the sleeve 1 forms a helical spring 6 having an internal diameter approximately the same as that of the spindle 7. The bores of the ends 2, 3 of the sleeve are enlarged as shown at 8, 9 so that the bearing surface for the spindle lies wholly within the length of the spring 6.

A key-way 10 is formed in the end 3 to receive a set-screw 11 whereby rotational movement of this end of the sleeve is prevented, and flats 12 are formed on the threaded end 2 to enable torsion to be applied to the sleeve. According to the direction of twist applied the diameter of the spring 6 is increased or decreased, and the sleeve can then be locked by means of a lock-nut 13.

An annular space 14 between the spring and the housing forms a reservoir for lubricant and it will be seen that the spring allows the lubricant to reach the whole of the bearing surface. Lubricant may be admitted to the top of the reservoir by a bent tube 15 whose exterior opening is provided with a ball 16 to prevent the ingress of dust or dirt. The ball can be pressed inwards against the action of a spring 17 to allow lubricant to be introduced. An aperture 18 fitted with a screwed plug 19 serves as a drain for the reservoir.

The sleeve and housing are covered by a knurled cap 20 screwing on to the housing and bearing on the top of the sleeve, and the housing is mounted on a spindle-bar 21, being secured by a nut 22.

By reason of the fact that the bearing surface lies wholly within the helix, flexibility is imparted to the bearing, and the bearing therefore serves to damp lateral vibration of the spindle. Further, the resistance to shear of the oil in the grooves of the helix tends to damp axial vibration of the spindle.

In the appended claims, the expression "spindle" is intended to include spindles or shafts, whether of large or small diameter, and whether solid or hollow, the invention not being limited in its application to any precise form of spindle or shaft.

What I claim and desire to secure by Letters Patent is:—

1. A spindle mounting comprising a bearing sleeve, said sleeve having tubular end portions and an intermediate helical bearing portion joining said end portions and integral therewith, and means for adjusting the diameter of the intermediate portion, said adjusting means comprising means to enable torsion to be applied to said intermediate portion and means to maintain the applied torsion on the intermediate portion.

2. A spindle mounting comprising a bearing sleeve, said sleeve having tubular end portions and an intermediate helical bearing portion joining said end portions and integral therewith, and means for adjusting the diameter of the intermediate portion, said adjusting means comprising means to hold one end of said sleeve against rotation, means to enable the other end of the sleeve to be rotatably adjusted against the torsion of the intermediate portion, and means to hold said end in adjusted position.

3. A spindle mounting comprising a housing, a bearing sleeve within said housing, said sleeve having tubular end portions and an intermediate helical bearing portion joining said end portions and integral therewith, and means for adjusting the diameter of the intermediate portion, said adjusting means comprising means to hold one end of said sleeve against rotation, means to enable the other end of the sleeve to be rotatably adjusted against the torsion of the intermediate portion, and means to hold said end in adjusted position.

4. A spindle mounting comprising a housing, a bearing sleeve within said housing, said sleeve having end portions and an intermediate helical portion joining said end portions, and means for adjusting the diameter of the intermediate portion, said adjusting means comprising a key for holding one end of said sleeve against rotation in said housing, interengaging screw-threads on the other end of said sleeve and on said housing, means for enabling said other end of the sleeve to be rotatably adjusted by being screwed into said housing, and means for holding said other end of the sleeve in adjusted position.

5. A spindle mounting comprising a housing, a bearing sleeve within said housing, said sleeve having end portions and an intermediate bearing portion of helical formation joining said end portions, and means for adjusting the diameter of the intermediate portion, said adjusting means comprising a key for holding one end of said sleeve against rotation in said housing, interengaging screw-threads on the other end of said sleeve and on said housing, means for enabling said other end of the sleeve to be rotatably adjusted by being screwed into said housing, and means for holding said other end of the sleeve in adjusted position.

6. A spindle mounting comprising a housing, a bearing sleeve within said housing, said sleeve having end portions, an intermediate helical portion joining said end portions, and a bearing surface lying wholly within the length of the intermediate portion, and means for adjusting the diameter of the intermediate portion, said adjusting means comprising a key for holding one end of said sleeve against rotation in said housing, interengaging screw-threads on the other end of said sleeve and on said housing, means for enabling said other end of the sleeve to be rotatably adjusted by being screwed into said housing, and means for holding said other end of the sleeve in adjusted position.

In testimony whereof I have hereunto subscribed my name.

ERNEST CECIL COPE.